United States Patent [19]
Orden

[11] 4,167,070
[45] Sep. 11, 1979

[54] EDUCATIONAL LUNG SIMULATOR

[76] Inventor: Burt B. Orden, 442 W. 57th St., New York, N.Y. 10009

[21] Appl. No.: 949,134

[22] Filed: Oct. 6, 1978

[51] Int. Cl.² .............................................. G09B 23/32
[52] U.S. Cl. ........................................................ 35/17
[58] Field of Search ............. 35/17, 19 R; 73/432 SD

[56] References Cited

U.S. PATENT DOCUMENTS

| Re. 29,317 | 7/1977 | Mosley | 35/17 |
|---|---|---|---|
| 3,049,811 | 8/1962 | Ruben | 35/17 |
| 3,154,881 | 11/1964 | Elwell | 35/17 X |
| 3,250,022 | 5/1966 | Midgley | 35/19 R |
| 3,273,261 | 9/1966 | Lovercheck | 35/17 |
| 3,274,705 | 9/1966 | Breakspear | 35/17 |
| 3,276,147 | 10/1966 | Padellford | 35/17 |
| 3,374,554 | 3/1968 | De Bella | 35/17 |
| 4,001,950 | 1/1977 | Blumensaadt | 35/17 |

*Primary Examiner*—Harland S. Skogquist

[57] ABSTRACT

In a preferred embodiment, there is provided a substantially rigid and self-supporting housing divided into two separate chambers and chamber spaces thereof each having mounted therein a separate lung-simulating flexible non-resilient enclosure structure and enclosure space thereof isolated from fluid flow communication with the chamber spaces, with the respective enclosure spaces being in flow communication with each other through an interconnecting conduit having mounted within conduit space a tube having an inflatable balloon mounted therearound adapted for inflation and deflation from an exterior location exterior to the interconnecting conduit, and each of the chamber spaces having a bellows mounted in flow communication with chamber space thereof with the bellows mounted above the flexible non-resilient enclosure structure within that chamber space, and a portion of each wall of the respective two separate chambers being flexible and in flow contact with exterior bellow and space thereof adapted to jointly increase pressure against the flexible portion of each of the separate chamber spaces concurrently by collapse of the exterior bellows and to jointly decrease pressure by expansion of the exterior bellows, and including on each flexible non-resilient enclosure structure on non-opposing walls thereof a multiplicity of mass elements positioned and adapted to exert pressure by gravitational force upon enclosure space as the flexible non-resilient enclosure structure is positioned in different positions.

12 Claims, 3 Drawing Figures

EDUCATIONAL LUNG SIMULATOR

This invention relates to an educational lung simulator advantageously utilizable as a teaching aid.

BACKGROUND TO THE INVENTION

Heretofore these has not existed any lung simulator structurally and functionally symbolic of the human lungs and of conditions representative of various respiratory ailments such as various disease and/or structural complications and the like, although there has existed and continues to exist a need for such a teaching aid in institutions of higher learning of the medical profession. U.S. Pat. No. 3,374,554 discloses a single flexible balloon purportedly representative of a lung within a transparent casing having a flexible resilient wall for expansion and contraction responsive to chamber pressure of the casing having a conduit from casing space vented to atmosphere, and pressure-producing mechaism attached to the input tube to the balloon; teaching capabilities in the use of such device would be severely limited. Otherwise, there have existed U.S. Pat. No. 3,276,147 and U.S. Pat. No. 4,001,950 and U.S. Pat. No. 3,049,811 each illustrating the effect of mouth-to-mouth recuscitation upon one or more inflatable bags having some resistance to inflation, and associated operating equipement therefor. Likewise U.S. Pat. No. 3,274,705 illustrate a plurality of three bags connected to inflate and deflate responsive to mouth-to-mouth recescitation practice methods, limited to such type demonstration.

SUMMARY OF THE INVENTION

Accordingly, objects of the present invention include the obtaining of an apparatus adapted to demonstrating visually and otherwise the effects of various phenomena of illnesses and/or other lung physical conditions upon the human body and its respiration and efforts to breath, together with other novel features.

Another object is to obtain an apparatus adapted to demonstrate the effects of different pressures and at different pressure positions on each or both of the lungs, and the effects of various positive and negative pressures thereon, and of failure of diaphragm function, and of muscular chest-uplifting pressures on the respective lungs, and the like.

Other objects become apparent from the preceding and following disclosure.

One or more objects of the invention are obtained by the embodiment illustrated herein as merely representative of a preferred embodiment thereof, to facilitate an understanding of the invention but not being intended to limit the scope thereof to merely the illustrative example, the scope including various modifications and variations and substitution of equivalents within ordinary skill of the art in this particular field.

Broadly the invention may be described as a lung chamber structure and mechanism thereof separately housing separate simulated lungs and adapted to subject independently the separate simulated lungs to separate varying gas pressures and degrees of vacuum exterior to space of the simulated lungs, the varying-pressure space being chamber space of the housing structure; the respective simulated first and second lungs each are composed of air-tight flexible but non-resilient enclosing walls and the thereby enclosed lung-space thereof preferably communicates with the other by an preferably interconnecting transparent connector tube, and there is a lung respirator mechanism such as an alternating piston pump which is connected operatively to the flow space of the interconnecting connector tube for varying pressure of gas within the simulated lungs.

In a further prefered embodiment, there are included at least one and preferably a multiplicity of mass elements on different non-opposing walls of at least one and preferably both simulated lungs, such that dependent upon the position of the housing and of the simulated lung therewithin, at least one mass element by virtue of gravitational pull applies pressure on the simulated lung(s), symbolic of various lung conditions and of the lung reaction to varying respiratory conditions of breathing.

In still another embodiment, the preferred transparent interconnecting connector preferably includes a tube surrounded by an inflatable balloon, mounted therein with necks thereto extending to exterior space for controlled inflation and deflation of the balloon.

As a mechanism for varying pressure within the chamber spaces but exterior to simulated lung enclosed-space, there is preferably connected to each chamber space, one to one chamber space and another to the other chamber space, separate bellows separately actuatable, such that collapse of the bellows increases pressure within the respective chamber and upon the simulated lung therein that space, and expansion of the bellows reducing gas pressure within that chamber space. This bellows, for each chamber, is preferably mounted over the simulated lung of that space.

Separate and additionally, there is preferably another bellows here-designated diaphragm bellows; there is provided that preferably at least a portion of the otherwise rigid housing of the lung chamber, is flexible (but not resilient), and the bellows space of the diaphragm bellows is in communication (closed communication) with that flexible portion of both of the lung chambers, such that collapse of the bellows increases gas pressure within both of the chamber spaces, and expansion of the diaphragm bellows reduces pressure within each and both of the chamber spaces.

It should be noted that great emphasis has been placed on non-resiliency but mere flexibility of various walls as noted-above for various structures. This is critically important for the utility of the present invention in being able to properly demonstrate various lung phenomena of the human lung and various conditions thereof, relative to the varying pressures and weights.

In particular, the apparatus of this invention and mechanism thereof, is designed to teach and illustrate the mechanics of lung function, incorporating typically the following unique features:

1. Lung-capacities will ventilate in erect, supine and prone positions.
2. Lung capacities can be ventilated by:
   a. movement of diaphragm-bellows;
   b. movement of pressurizing lung-capacities through airway resistance;
   c. CPAP, IPPB, Incentive Siprometry; and
   d. Lung Function tests including helium dilution, nitrogen wash-out, compliance measurement and broncho-spirometry.

Principles of operation are as follow, for spontaneous ventilation. The entire housing structure (and simulated lungs mounted therein) is placed in the desired position (supine, or prone, or erect). The diaphragm bellows is expanded to create negative pressure inside the chamber spaces thereby inflating the lung-capacities. Movement of the diaphragm may optionally be manually or by machine semi-automatically or automatically.

The invention may be also utilized to illustrate mouth-to-mouth techniques of mechanical (artificial) ventilation. All connections are made by airway resistance. Lung-capacities will inflate and deflate appropriately. These may be also present a separate heat chamber pressing against a flexible wall of one of the lung-housing chambers; the heart cavity space may be hyperinflated to show change in compliance of the lung.

Pneumothorax may be simulated by opening manometer stopcocks or tees or any combination thereof, as shall be more fully discussed in the below detailed description, such relating to a pump or other mechanism for evacuating the respective lung-housing chambers. In any event, treatment of pneumothorax can be demonstrated by applying negative pressure by appropriate mechanism.

As to ventilation, IPPB (Intermittent Pressure Breathing) or IPPV (Intermittent positive pressure ventilation) may be applied by connecting a ventilator to airway resistance into the interconnecting connector tube and proceeding as with humans. Inspiration begins when there is negative pressure generated in lung-capacity enclosures, i.e. interior lung enclosure spaces. The effects of PEEP (Positive end expiratory pressure) and CPAP (Constant Positive Airway Pressure) may be demonstrated by injecting into the lung enclosure space(s) a minor amount of water pressure.

As to Incentive Spirometry and Lung Function Tests, when any type of spirometer is connected to airway resistance of the gas inlet conduit to the interconnecting conduit, lung-capacity enclosure pressures may be changed by such pressure generators as Bennet PR-2, Bird Mark 8. Baby Bird, and the like. There are connected conventionally to appropriate chamber space conduits and operation with appropriate timers set in accord with the phenomena intended to be illustrated and demonstrated insofar as appearance of the simulated lungs during various phases of the operation; such as for peak inspiratory pressure, and for decreasing inspiratory and expirators times by increasing the respective flow rate control. Lung-capacity pressures are readable on manometers, as a part of the visual demonstration, connected to space in communication with the lung enclosure spaces, while lung-capacity enclosure pressures are read on monometers connected to the lung-housing chamber spaces.

For compliance measurements, since pulmonary compliance is defined as the differential pressure divided by the differential volume, the measurements can be made by reading lung-capacity pressure at any level of inflation, inflating the lung capacities to a specific volume level and reading the change in pressure on the manometer thereof.

For obstructive disease, when airway obstruction of flow through the gas-furnishing conduit to the interconnecting connector, balloons are inflated to reduce the lumen of the brances of airway resistance, simulating stenosis of the bronchi, as in emphysema, bronchitis, and asthma. In addition, rapid flow rates will cause the thin-walled silastic collapsible airway to collapse, demonstrating symptoms of these obstructive diseases.

The invention may be better understood by making reference to the following Figures.

THE FIGURES

DETAILED DESCRIPTION

Figure 1:
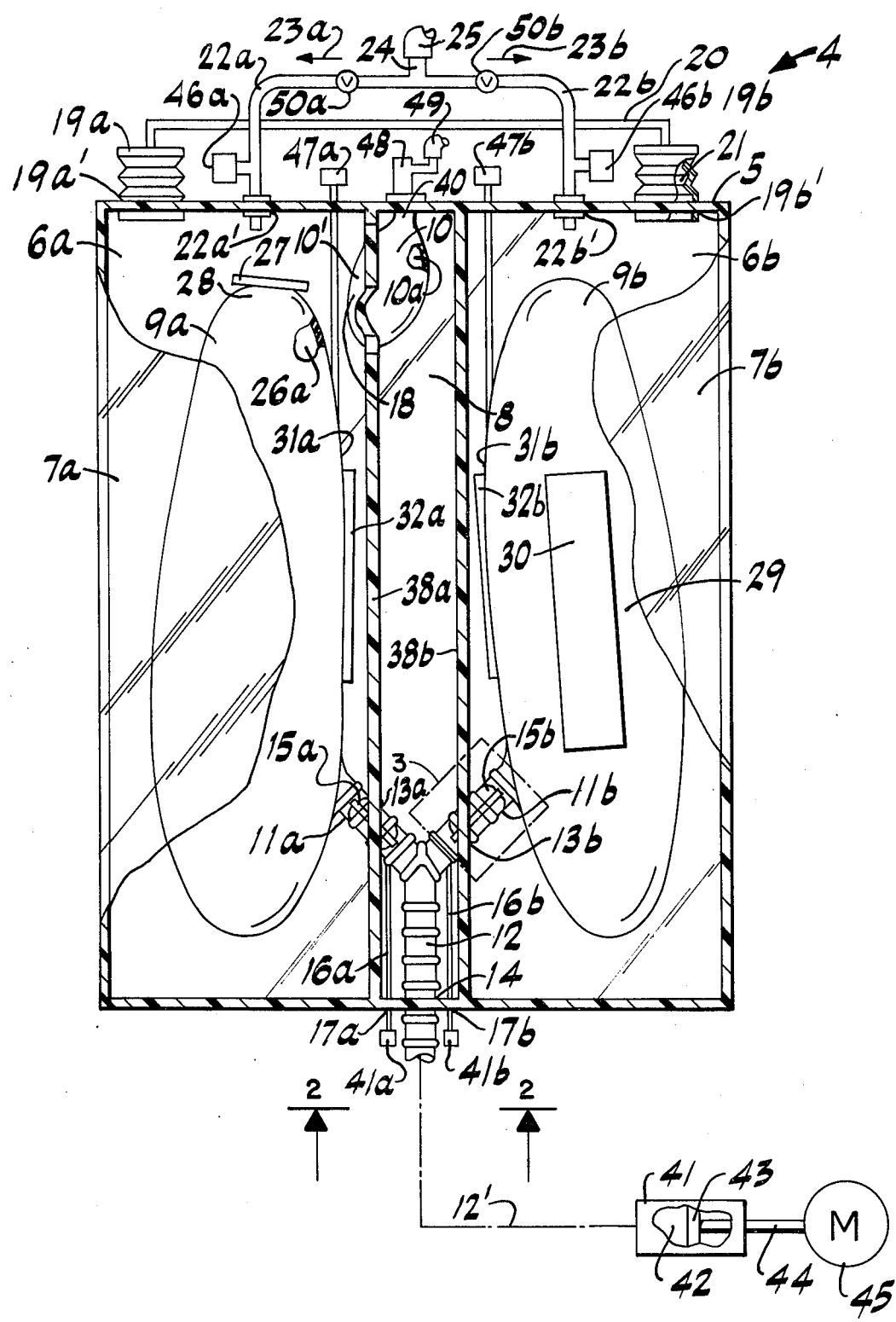
FIG. 1 illustrates a front elevation view of a simulator structure with partial cutaway of a transparent front wall and of transparent side walls enclosing separate spaces containing symbolic lungs and heart, with mass elements mounted on the lung surfaces, and diagrammatic pump and various conduits and manometers.

The simulator 4 includes preferably all transparent walls as exterior walls of the main casing, except for the back bellow portion—and even that might be of transparent semi-flexible bellows-adaptable type plastic, such as the plastic walls 7a and 7b shown in partial cutaway (for illustration purposes) and the cross-sectional views of the walls 5, as shown in FIG. 1; there are thereby the separately enclosed spaces 6a and 6b and 8, having the enclosed simulated lung (flexible air-tight bags) 9a and 9b enclosed therein, and the simulated heart-sack 10 also air-tight. Illustrated is the lung interior space 26a, 26b, and heart sack interior space 10a. The mass element 30 is mounted on a front face 29 of one of the simulated lungs 9b, and mass elements 32a and 32b are mounted on the inner lung surfaces 31a and 31b, and mass element 27 mounted on upper face 28 of lung 9a, whereby by positioning the simulator in different positions and orientations, diverse pressures differing from one-another can be caused to be exerted on the simulated lungs 9a and 9b. The interior space, such as space 26a, of each simulated lung 9a and 9b are connected by simulated bronchial tubes 11a and 11b to the simulated esophagus 12 which is operatively connected to a piston pump (or other pressurizer and evacuator) 41 diagrammatically driven as a piston 43 in space 42 by motor 45 through 44. Spaces 6a and 6b are each furnished with air or other gas pressure and/or subjected to evacuation by way of appropriate pressurizing and/or evacuation equipment and mechanism connected through (shown-in-part) tube 25 connected to conduit 24 continued as conduits 22a and 22b respectively having separate control valves 50a and 50b respectively, with the conduits 22a and 22b connected to enclosed spaces 6a and 6b through simulator wall apertures 22a' and 22b', with the respective pressures of spaces 6a and 6b being monitored by the respective manometers 46a and 46b; thus, gas is pumped into the space 6a by directional flow 23b. While the space-segregating walls 38a and 38b are preferably rigid in order to afford further support structure, the wall portion 10' is flexible in order that gas pressure within space 6a may (as in real life) subject pressure to the heart-sack 10 and space 10a therein, the space 10a being gas (such as air) and/or evacuated by way of conduit 48 connected with sack neck 40 of the flexible heart-sack 10, and there may likewise be a manometer monitoring pressure within this space in order to illustrate the differing pressures within the heart-sack space 10a responsive to differing pressures in space 6a which in turn differ responsive to changes in lung space 26a pressure through the wall thereof of simulated lung 9a. Accordingly, the heart-sack is positioned (& preferably adhered to) the wall section 10' such that there is a bulge 18 into the space 6a. Mechanical handle 20 is anchored to the movable ends 19a and 19b of the respective bellows thereof which are mounted through apertures 19a' and 19b' respectively communicating with spaces 6a and 6b respectively, for the varying of pressures within these spaces respectively; collapse of the bellows by downward movement of ends 19a and 19b respectively, increases pressure within the spaces 6a and 6b; it is not necessary that both be increased simultaneously nor to the same extent, by virtue of mere control of the mechanical handle 20; the controls through movable ends 19a and 19b are symbolic of the control of chest-space pressures by the chest muscles and typically by the lifting of and lowering of the left and right arms, to thereby vary pressure(s) on the simulated lung(s) 9a and/or 9b, whereby breathing-pressures are caused upon the gas or air within space(s) 26a and/or 26b, illustrating that it is possible to breath by use of these types of muscles, as opposed to use of a diaphragm muscle of the human or animal body. Gas is furnished to and/or evacuated from conduit 48 by tube 49 connected to any conventional or appropriate pressurizer and/or evacuator equipement or device. Respective pressures within spaces 26a and 26b are monitored by manometer 47a and 47b. While not illustrated, there may likewise be a manometer monitoring of the space 8, and likewise of the space 10a of the heart-sack 10; however, normally, the visual observation of the effect of changing pressure within the space 6a upon the wall bulge 18 is sufficient for teaching purposes.

Figure 2:
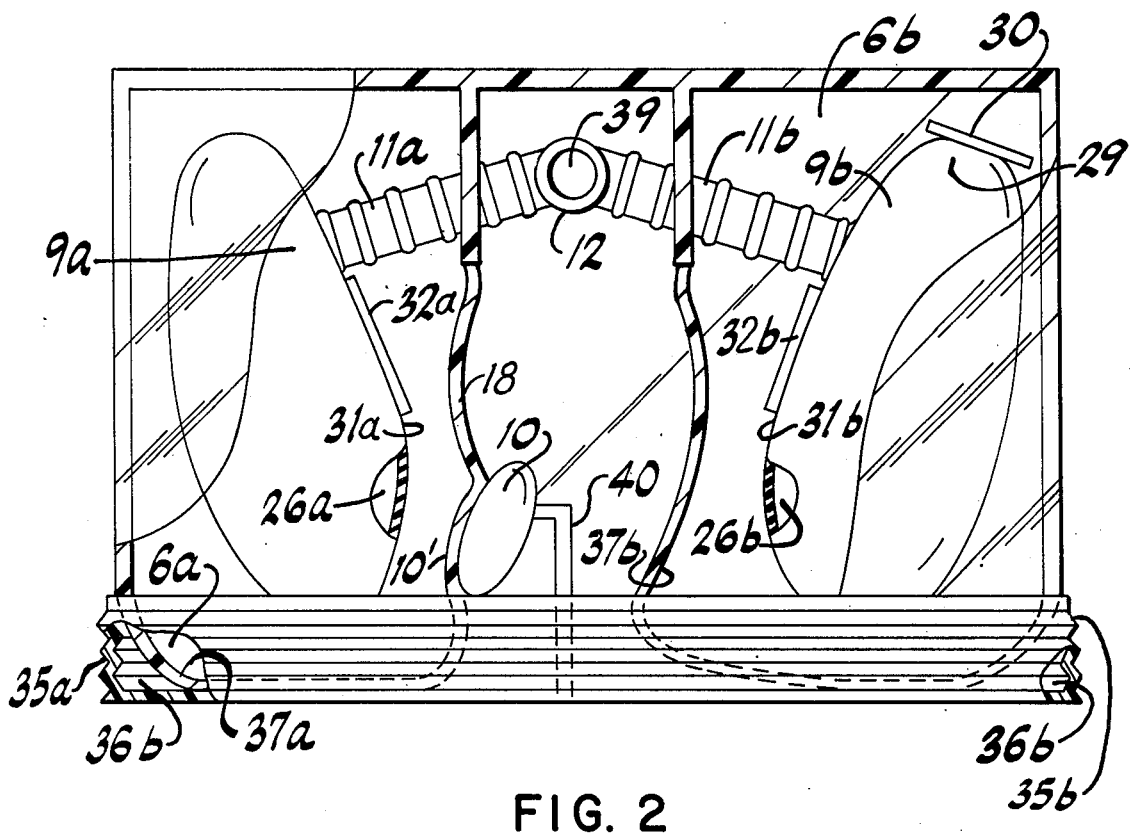
FIG. 2 illustrates a view of the embodiment of FIG. 1 as taken along lines 2—2 of FIG. 1.

The simulated trachea 12 is located within space 8, communicating with the respective simulated bronchial tubes 11a and 11b, through respective wall apertures 14 and 13a and 13b, the gas to and from the the bronchial tubes 11a and 11b being through the communicating esophagus space 39 as seen in FIG. 2.

Figure 3:
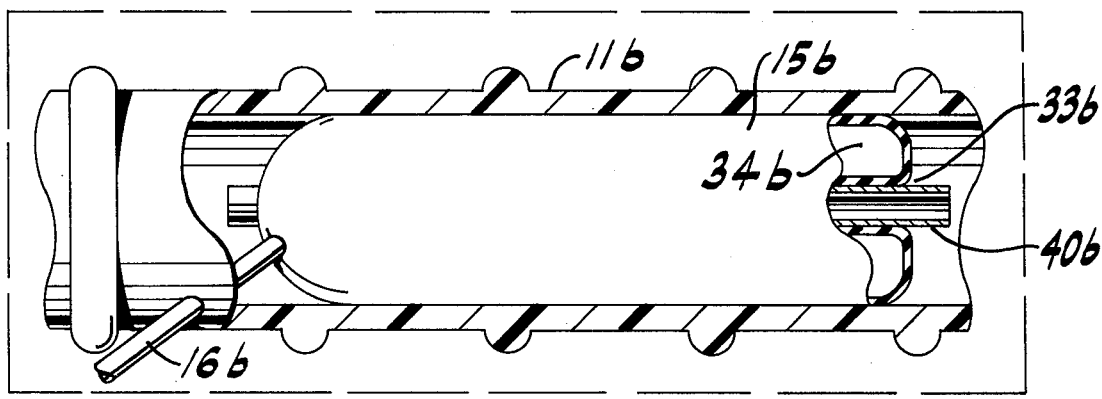
FIG. 3 illustrates an enlarged view and detailed illustration of the bronchial tube inflation device for the designated portion 3 of FIG. 1.

Mounted within each simulated bronchial tube 11a and 11b, are respective simulated airway-obstruction by-pass devices 15a and 15b best illustrated by the FIG. 1-section #3 enlargement portrayed symbolically in the FIG. 3, having conduits 16a and 16b respectively furnishing compressing gas (air) to and from the balloons' spaces 34a (not shown) and 34b by way of the compressors (or the like) 41a and 41b respectively, conduits 16a and 16b typically passing through wall apertures 17a and 17b. Each balloon envelops a tube 40b passing through enveloped space 33b, and when the balloons are inflated, the entire devices 15a and 15b respectively are anchored within the respective simulated bronchial tubes 11a and 11b; such is symbolic of use of such balloons which when inflated press-back and open the wall of swollen and/or contracted bronchial tube wall tissue which would (and does in various animal and human conditions) block passage of air to and from the lungs by way of the bronchial tube passage, now possible through tube 40b.

The FIG. 2 illustration illustrates an additional bellows structure in communication with flexible walls 37a (a continuation of flexible wall 18) and 37b by gas within space 36b thereof; collapse of bellows portion 35a causes increased pressure within space 6a, and collapse of bellows portion 35b causes increased pressure within space 6b, and likewise expansion of these bellows portions causes reduced pressures within these spaces. This bellows, and the effect thereof in altering pressures within the respective spaces 6a and 6b, and therefore indirectly also altering pressures respectively within spaces 26a and 26b respectively, is symbolic of the breathing functioning of the diaphragm of the human and/or animal body. As in the human body, increased pressure by contraction of the bellows portions 35a and 35b, causes the simulated lungs 9a and 9b respectively to be compressed to thereby expel air therefrom—or if the valve(s) and/or conduit line 12' is somehow shut-off or otherwise blocked, to result in an increased pressure within the lung spaces 26a and 26b as a result of the compression force(s) on the outer surfaces of the walls of the simulated lungs 9a and 9b.

It is within the scope of the present invention to make such variations and/or modifications and/or substitution of equivalents as would be apparent to a person of ordinary skill.

I claim:

1. An educational lung simulator device comprising in combination: lung chamber means for separately housing separate simulated lungs and for subjecting separate simulated lungs independently to varying gas pressures and degrees of vacuum, and for providing visual observation of separate simulated lungs one within each of separate enclosures of the chamber means; and separate first and second flexible non-resilient enclosure structures each symbolic of said simulated lungs, each forming an enclosure space in fluid flow communication with the other thereof, the first flexible non-resilient enclosure structure being housed within one enclosure and the second flexible non-resilient enclosure structure being housed in another enclosure of said lung chamber means, each enclosure space of the first and second flexible non-resilient enclosure structures being isolated from fluid-flow communication with gas pressures and degrees of vacuum of said lung chamber means and being each jointly connected to and including an interconnecting conduit connecting the enclosure spaces to one-another; and lung respirator means for varying gas pressures within said enclosure spaces of the first and second flexible non-resilient enclosure structures, connected operatively in flow communication with said interconnecting conduit.

2. An educational lung simulator device of claim 1, in which said lung chamber means comprises a separate substantially rigid chamber structure for each of said first and second flexible non-resilient enclosure structures and including a flexible wall section as a part of the substantially rigid chamber structure; and including a diaphragm bellows structure having compression space thereof in flow communication with an exterior face of said flexible wall section of each of the substantially rigid chamber structures adapted to increase chamber pressures by collapse of bellow structure and to decrease chamber pressures by expansion of bellow structure of the diaphram bellows structure.

3. An educational lung simulator device of claim 1, including a tubular structure having a balloon mounted therearound, positioned within through-space within said interconnecting conduit, and the balloon including a gas-flow conduit to space therein adapted for inflating and deflating therethrough from a location exterior to said interconnecting conduit.

4. An educational lung simulator device of claim 1, in which at least a portion of housing structure of said lung chamber means is substantially transparent providing for observation of housed simulated lung structure.

5. An educational lung simulator device of claim 1, in which said lung chamber means comprises a separate substantially rigid chamber structure for each of said first and second flexible non-resilient enclosure structures, each rigid chamber structure including a bellows structure connected in operative flow communication with chamber space adapted to increase chamber pressure by collapse of the bellow structure and to decrease chamber pressure by expansion of the bellows structure.

6. An educational lung simulator device of claim 4, in which each of said bellows structures of the respective first and second flexible non-resilient enclosure structures, is located mounted with inlets at and to chamber spaces of the separate substantially rigid chamber structures positioned-above respective ones of the first and second flexible non-resilient enclosure structures.

7. An educational lung simulator device of claim 1, including a mass element of predetermined maximum mass sufficient to exert a gravitational force onto a flexible wall of one of said first and second flexible non-resilient enclosure structures for compressing gas within the enclosure space thereof when positioned above that enclosure space, mounted on a flexible wall of said one, positioned to exert said gravitational force.

8. An educational lung simulator device of claim 7, including a tubular structure having a balloon mounted therearound, positioned within through-space within said interconnecting conduit, and the balloon including a gas-flow conduit to space therein adapted for inflating and deflating therethrough from a location exterior to said interconnecting conduit.

9. An educational lung simulator device of claim 7, including a plurality of said mass elements mounted on each of said first and second flexible non-resilient enclosure structures, one on each of three nonopposing faces of the flexible non-resilient enclosure structure thereof such that the effect of exterior pressure from any of three different directions is illustratable by repositioning said lung chamber means to selectively obtain gravitational pressure of a desired one of the mass elements upon gas within that flexible non-resilient enclosure structure.

10. An educational lung simulator device of claim 9, in which said lung chamber means comprises a separate substantially rigid chamber structure for each of said first and second flexible non-resilient enclosure structures, each rigid chamber structure including a bellows structure connected in operative flow communication with chamber space adapted to increase chamber pressure by collapse of the bellow structure and to decrease chamber pressure by expansion of the bellows structure, each of said bellows structures of the first and second flexible non-resilient enclosure structures being located mounted with inlets at and to chamber spaces of the separate substantially rigid chamber structures positioned-above respective ones of the first and second flexible non-resilient enclosure structures.

11. An educational lung simulator device of claim 10, in which said lung chamber means comprises a separate substantially rigid chamber structure for each of said first and second flexible non-resilient enclosure structures and including a flexible wall section as a part of the substantially rigid chamber structure; and including a diaphragm bellows structure having compression space thereof in flow communication with an exterior face of said flexible wall section of each of the substantially rigid chamber structures adapted to increase chamber pressures by collapse of a bellow structure of the diaphragm bellows structure.

12. An educational lung simulator device of claim 11, in which at least a portion of a wall of said substantially rigid chamber structure is substantially transparent.

* * * * *